United States Patent [19]

Edelmann et al.

[11] 4,146,473
[45] Mar. 27, 1979

[54] DEWATERING OF MINERAL SUSPENSIONS

[75] Inventors: Gerhard Edelmann, Kelkheim; Heinz Müller, Burgkirchen, Alz; Friedrich Rosenstock, Frankfurt am Main, all of Fed. Rep. of Germany

[73] Assignee: Hoechst Aktiengesellschaft, Frankfort am Main, Fed. Rep. of Germany

[21] Appl. No.: 782,365

[22] Filed: Mar. 29, 1977

[30] Foreign Application Priority Data

Apr. 2, 1976 [DE] Fed. Rep. of Germany ........ 2614260

[51] Int. Cl.² ............................................. B01D 21/01
[52] U.S. Cl. ........................................ 210/52; 210/54; 210/67; 210/75; 209/5
[58] Field of Search ..................... 75/2, 3, 108; 209/5; 210/42 R, 51, 52–54, 59, 75, 45, 67; 423/140, 143

[56] References Cited

U.S. PATENT DOCUMENTS

| 2,266,954 | 12/1941 | Bonnet et al. ......................... 210/54 |
| 2,315,734 | 4/1943 | Ralston et al. ......................... 210/54 |
| 2,862,880 | 12/1958 | Clemens .................................. 210/54 |
| 3,479,282 | 11/1969 | Chamot et al. ......................... 210/54 |
| 3,529,957 | 9/1970 | Kunda et al. ............................. 78/108 |
| 3,545,941 | 12/1970 | Wilson .................................... 210/54 |

FOREIGN PATENT DOCUMENTS 2425394 12/1974 Fed. Rep. of Germany ................ 75/2

*Primary Examiner*—Charles N. Hart
*Assistant Examiner*—Peter A. Hruskoci
*Attorney, Agent, or Firm*—Connolly and Hutz

[57] ABSTRACT

An improved process for concentrating and dewatering of mineral suspensions by filtration which comprises adding to the suspension prior to the filtration as filter aid a composition containing a sulfosuccinate of the formula I

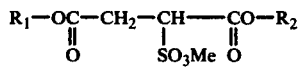

wherein $R^1$ and $R^2$ each are an alkyl radical having about 6 to 12 carbon atoms and Me is an alkali metal, and an aliphatic amine having at least 5 carbon atoms.

7 Claims, No Drawings

DEWATERING OF MINERAL SUSPENSIONS

Mineral concentrates, which have been obtained by wet processes, for example by flotation, or mineral suspensions, which have been conveyed, for example by a pipeline, must be dewatered, for example by pyrometallurgical processes, before being further transported or processed. By the dewatering process it is intended to keep as low as possible the content of residual moisture of the material after filtration to reduce the drying costs of the material or to make pelleting of the material possible.

A variety of suspensions, especially those containing minerals which have not to be ground to very fine particles, can be dewatered without difficulty during the filtration to attain the desired contents of residual moisture.

Especially disseminated ores or those forming a high portion of slurry when being ground, can be filtered only with difficulty. This applies especially to limonite-containing oxide iron ores. In these cases the residual water contents of the filter cakes are frequently so high that they make pelleting which is required for dressing, impossible.

It is already known to add water-soluble organic polyelectrolytes, for example starch derivatives of polyacrylamides, which may be partially saponified, as filter aids, in filtration processes and especially in the filtration of mineral pulps. By these agents the specific filter capacity is improved, but the water content of the filter cake is not reduced. In most cases, there is obtained even a higher water content of the filter cake, as a result of the improved filter capacity.

In filtration processes, lower contents of residual moisture can be principally obtained by reducing the thickness of the filter cakes. For this purpose a larger filter surface is, however, required, which makes such a procedure uneconomic for relatively cheap raw materials such as iron ores. Moreover there is the danger of a breaking of the filter cake and thus the vacuum is reduced and the dewatering is less efficient.

Trials have also been made to improve the filter capacity by heating the mineral pulps or by using steam cone filters. These procedures, however, require high energy expenses and the results are seldom sufficient.

Furtheron it is known to use wetting agents are filter aids. These agents act in the following manner: They reduce the surface tension of the water contained in the capillaries of the filter cake so such a degree that the water can flow off more easily. Wetting agents, which may be cationic, anionic or non ionic, are generally known as filter aids. Cationic products are, however, not very efficient for the filtration of iron ores at the generally occuring pH values. They tend to form a tough froth stabilized by sludge. The anionic and non ionic products have two substantial disadvantages: They have a great tendency to form froths and they may have a dispersing effect, especially in the case of limonite-containing ores. The vigorous froth formation leads to a reduction of the pulp weights, to the formation of pores in the filter cake and, as a consequence thereof, to a reduction of the filter capacity and of the vacuum. The anionic sulfosuccinic acid esters, for example, known as filter aids from U.S. Pat. No. 2,266,954, which have been used successfully in a variety of minerals, fail completely in limonite-containing iron ores rich of sludge, since the intense froth, which is inavoidable owing to turbulences in the total system, is considerably stabilized by the sludge portion. The filtration is moreover influenced detrimentally by the fact that sulfosuccinic acid esters have a dispersing effect. Thus, the filter capacity drops below the economically acceptable level and the residual moisture content in the filter cake is even increased.

It has now been found that surprisingly a composition comprising a surface-active alkali metal-di-alkyl-sulfosuccinate and aliphatic amines containing at least 5 carbon atoms has both a poor frothing capacity and a high efficiency when being used in the dewatering of aqueous mineral suspensions, especially during the filtration.

This result is surprising, as due to at least partial neutralization of the anionic tenside by a cationic product a reduced froth formation with simultaneous reduced efficiency was to be expected at the most, but not an improvement of the filtering effect. It is further surprising that these combinations remain liquid and are apparently sufficiently soluble to be efficient. Instead of the attained improvement a precipitation and, as a consequence thereof, a substantial inefficiency was to be expected more readily when combining long chain anionic tensides with cationic auxiliaries.

It has also been found that, when using simultaneously such composition with water-soluble organic polyelectrolytes, for example non ionic or anionic polyacrylamides, the material to be filtered, for example limonite-containing iron ores, which are rich of sludge and pulverized to fine particles, can be dewatered to a higher degree than when using the above components alone. This fact is surprising as the contrary effect had to be expected for the additional use of a polymer flocculation agent with a conventional wetting agent for ores of said nature, according to the experiences made hitherto.

The present invention consequently provides an improved process for the concentration and dewatering of mineral suspensions, especially by filtration of the suspension, which comprises adding to the mineral suspension a combination of a surface-active sulfosuccinate of the formula I

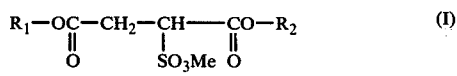

wherein $R^1$ and $R^2$ each stand for an alkyl radical having of from about 6 to 12 carbon atoms and Me stands for an alkali metal, especially sodium or potassium, and an aliphatic amine having at least 5 carbon atoms, and separating the water subsequently in usual manner, preferably by filtration, and pelletizing the filtered material, if desired.

Suitable sulfosuccinates of the formula I which are utilized in the invention are those containing straight chain or branched alkyl radical having of from 8 to 19 carbon atoms. $R^1$ and $R^2$ may also be different from one another. It is likewise possible and often advantageous to use mixtures of different sulfosuccinates of the formula I.

As the second component of the composition to be used according to the invention primary, secondary or tertiary amines are suitable. Generally, liquid amines are used, which have the formula II

wherein R' is an alkyl, alkoxyethyl or alkoxypropyl radical having of from about 5 to 12 carbon atoms in the alkyl or alkoxy radical, R" and R''' each stand for a hydrogen atom or an alkyl radical having of from 1 to 12 carbon atoms, the radicals R', R" and R''' containing optionally up to 30 carbon atoms. Primary alkylamines having of from 5 to 12, especially of from 8 to 10, carbon atoms, are used preferably, the alkyl radicals being optionally straight chain or branched. Instead of the free amines, their salts, for example chlorides or acetals, can also be used.

The weight ratio of both components of the composition, i.e. the surface-active sulfosuccinate of the formula I and the aliphatic amine, may vary within wide limits. Generally for 1 mol of the sulfosuccinate less than 1 mol of the aliphatic amine, in most cases of from about 0.1 to 0.9 mol, preferably of from 0.5 to 0.8 mol, are used. Both components are advantageously added to the mineral suspension together or simultaneously. The mixtures of both components may be used in a pure, undiluted form or in a slightly diluted form or as an aqueous emulsion. Sulfosuccinates of the formula I are generally used in the form of concentrated aqueous-alcoholic solutions in most cases of about 70% strength. In this form they are prepared and commercially available.

It is also possible to add the sulfosuccinate and the aliphatic amine separately to the mineral suspension to be dewatered.

The feed quantities of the composition of sulfosuccinate and amine may vary within wide limits. They must be adapted to the local conditions in each case. Generally they are in the range of from about 100 to 1000 g/metric ton of solid matter in the mineral suspension. Most frequently there are used about 200 to 500 g of the composition per 1 metric ton of solid matter.

The auxiliaries are advantageously added to the mineral suspension at the conventional places, for example in the pump sump located before the filter, in an intermediary placed vessel or in a conditioning vessel or by a dosing station into the pipeline. Generally a conditioning period of approximately up to 10 minutes, in most cases of from about 1 to 5 minutes, is maintained prior to filtering and after completion of the addition. If only a short period of action of the auxiliaries is required, they may also be added directly into the filter trough.

The use of the composition of the surface-active sulfosuccinates of the formula I and aliphatic amines, especially in mineral suspensions having a high portion of sludge and in suspensions of limonite-containing oxide iron ores makes it possible to attain a dewatering degree of the suspension, which has not been obtained hitherto. The addition of the composition according to the invention moreover has an advantageous effect on the pelletization subsequent to the filtration process.

It has moreover been found that a higher degree of dewatering of the mineral suspension and a further improvement of the pelletability of the filtered materials can be attained by adding in addition to the composition of sulfosuccinates and aliphatic amines a polymer flocculation agent known per se. These flocculation agents may be water-soluble organic polyelectrolytes, for example starch or cellulose derivatives and especially non ionic or anionic polyacrylamides. The polyacrylamides are conventional flocculation agents, which can be obtained by polymerization of acrylamide and optionally by partial saponification with the formation of free carboxyl groupes or by copolymerization of acrylamide and acrylic acid, and which have a molecular weight in the range of from about 3 to 12 millions. The flocculation agents in the process of the invention are used as a diluted aqueous solution in most cases of about 0.01 to 0.2 % strength. They are used in an amount of from about 1 to 10 g/t of solid matter in the mineral suspension.

In contrast to the composition, the flocculation agent is generally added only shortly before the filtration process begins, for example in the filter trough.

The following examples illustrate the invention. The percentages are to be understood as percentages by weight and the tons as kilotons.

EXAMPLE 1

A Russian limonite-containing iron ore, 95% of which had been pulverized to a particle size of less than 32 μm and which had a specific surface of 2600 cm$^2$/g was filtered on a rotary disk filter according to the method indicated sub (a) to (e), under the same conditions of temperature and pressure (pulp density 2.0, which corresponds to a solid content of about 65%) and the residual water content in the filter cake was determined by drying at 105° C until the weight remained constant. The results are listed in the following table. They manifest the superiority of the process according to the invention.

| | feed quantity | residual water |
|---|---|---|
| a) without addition of a filter aid, at 18 – 20° C | | 11.8% |
| b) without addition of a filter aid, pulp heated to 70° C (steam cone) | | 10.5% |
| c) after addition of sodium di-2-ethylhexylsulfosuccinate as 70% solution in water/alcohol (1:1) at 18 – 20° C. | 300 g/t | 10.5% |
| d) after addition of sodium-di-2-ethyl-hexylsulfosuccinate, with steam cone (70° C) | 300 g/t | 9.8% |
| e) after addition of a mixture of 1 mol of sodium-di-2-ethyl-hexylsulfosuccinate (70% solution in water/alcohol 1:1) and 0.5 mol of 2-ethylhexylamine without heating (18 – 20° C) | 300 g/t | 9.8% |

EXAMPLE 2

A limonite-containing iron ore, 85% of which had been pulverized to a particle size of less than 0.045 mm and which had a specific surface of about 3300 cm$^2$/g, was dewatered on a drum filter according to the methods indicated sub (a) to (f). The process was carried out without increasing the temperatures of the pulps, at 18 – 20° C. For this ore, a pelletization of the filter cake is possible only from residual moisture contents of less than about 10.5%. The following table shows the results obtained. The superiority of the process of the invention is evident.

| | feed quantity | residual moisture |
|---|---|---|
| a) without auxiliary | | 14.2% |
| b) after addition of sodium-di-2-ethyhexylsulfosuccinate as 70% solution in water/alcohol (1:1) | 300 g/t | 12.8% |

-continued

| | feed quantity | residual moisture |
|---|---|---|
| c) after addition of an anionic polyacrylamide having an average molecular weight of 12,000,000 | 5 g/t | 14.2% |
| d) after addition of sodium-di-2-ethylhexlsulfosuccinate and an anionic polyacrylamide | 295 g/t + 5 g/t | 12.8% |
| e) after addition of a mixture of 1 mol of sodium-di-2-ethylhexylsulfosuccinate and 0.5 mol of 2-ethylhexylamine | 300 g/t | 12.6% |
| f) after addition of a mixture according to c) and of an anionic polyacrylamide | 295 g/t + 5 g/t | 10.2% |

What is claimed is:

1. An improved process for the concentration and dewatering of aqueous mineral suspensions by filtration, which comprises adding thereto as filter aid about 100 to 1000 grams, per metric ton of the solids therein, of a composition consisting of a sulfosuccinate of the formula I $$R_1-O-\underset{\underset{O}{\|}}{C}-CH_2-\underset{\underset{SO_3Me}{|}}{CH}-\underset{\underset{O}{\|}}{CO}-R_2 \quad (I)$$

wherein $R^1$ and $R^2$ each stand for an alkyl radical having of from about 6 to 12 carbon atoms and Me stands for an alkali metal, and an aliphatic amine of the formula $$R'-\underset{\underset{R''}{|}}{N}-R'''$$

wherein R' is an alkyl, alkoxyethyl or alkoxypropyl radical having of from 5 to 12 carbon atoms in the alkyl or alkoxy radical, R" and R'" each stand for a hydrogen atom or an alkyl radical having of from 1-12 carbon atoms, the radicals R', R", and R'" containing a total of not more than 30 carbon atoms, said composition containing per mol of the sulfosuccinate less than 1 mol, but at least 0.1 mol, of the aliphatic amine and filtering the mineral suspension.

2. The process for the concentration and dewatering of mineral suspensions as claimed in claim 1, which comprises adding additionally to the mineral suspension prior to filtering as flocculation agent a water-soluble organic polyelectrolyte.

3. The process as claimed in claim 1, wherein the composition contains as aliphatic amine a primary alkylamine having of from 5 to 12 carbon atoms.

4. The process as claimed in claim 1, which comprises adding as flocculation agent a non ionic or anionic polyacrylamide.

5. Process as claimed in claim 1, which comprises pelletizing the filtered material.

6. The process as claimed in claim 1, wherein the filtration is carried out after about 1 to 5 minutes following completion of the addition of said filter aid composition.

7. The process as claimed in claim 1, which comprises additionally adding to the mineral suspension prior to filtering about 1 to 10 grams of a water-soluble organic polyelectrolyte as a flocculation agent.

* * * * *